March 18, 1958 J. W. DICKEY 2,826,907
FREEZING POINT TESTER OF ARCTIC COOLANTS
FOR INTERNAL COMBUSTION ENGINES
Filed April 14, 1955
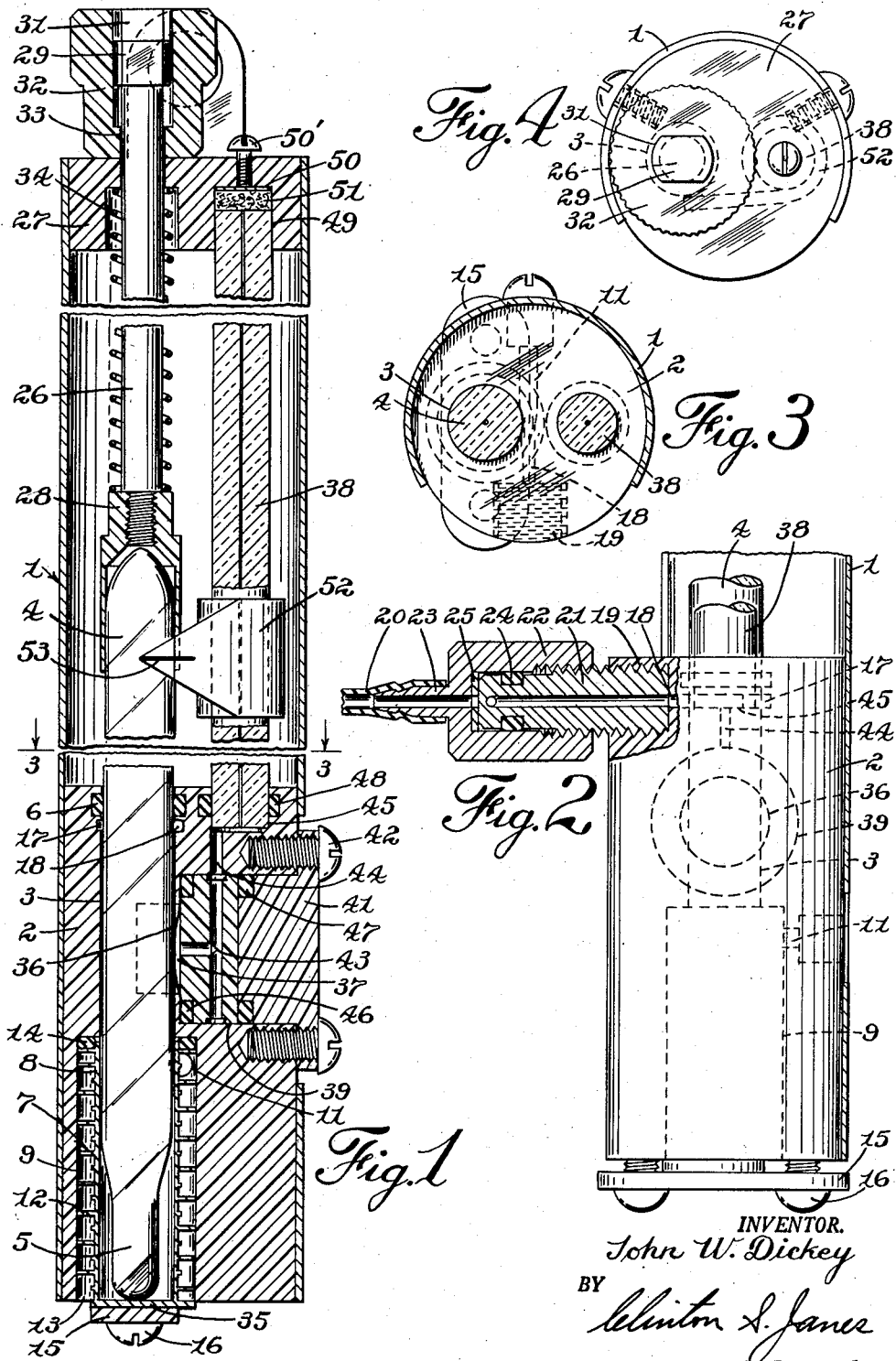
INVENTOR.
John W. Dickey
BY
Clinton L. James
ATTORNEY

United States Patent Office 2,826,907
Patented Mar. 18, 1958

2,826,907

FREEZING POINT TESTER OF ARCTIC COOLANTS FOR INTERNAL COMBUSTION ENGINES

John W. Dickey, Newfield, N. Y., assignor to Bendix Aviation Corporation, a corporation of Delaware Application April 14, 1955, Serial No. 501,388

4 Claims. (Cl. 73—17)

The present invention relates to a freezing point tester of arctic coolants for internal combustion engines, and more particularly to an instrument of this type which indicates the thawing point of a previously frozen sample.

Devices of this character, such as shown for instance in applicant's prior Patent 2,688,247, issued September 7, 1954, have been perfected to the point of commercial acceptance, but a need exists for a simpler and cheaper instrument even at the sacrifice of some of the automatic features of the present commercial freeze meters.

It is an object of the present invention to provide a novel freeze meter which is simple and economical in construction, easy to operate and which provides an accurate, plainly visible indication of the critical temperatures.

It is another object to provide such a device which utilizes the change of volume of the liquid caused by the formation of ice crystals, to signalize the freezing or thawing point of the liquid.

It is another object to provide such a device in which the critical point is indicated unmistakably irrespective of external conditions, ambient temperatures etc.

It is another object to provide such a device which is small enough to be carried in the usual glove compartment of an automobile, or may be kept displayed as a conventional thermometer.

Further objects and advantages will be apparent from the following description taken in connection with the accompanying drawing in which:

Fig. 1 is a front elevation of a preferred embodiment of the invention, partly broken away and in section;

Fig. 2 is a side view of the lower portion of the instrument, partly broken away and in section;

Fig. 3 is a section taken substantially on the line 3—3 of Fig. 1; and

Fig. 4 is a top view of the device.

In Fig. 1 of the drawing there is illustrated a frame or housing member indicated generally by the numeral 1 and comprising a body 2 of suitable material such as transparent plastic having a tubular opening 3 for the reception of the cylindrical glass stem 4 of a conventional spirit thermometer, the temperature sensitive element 5 of which is located at the lower end of the body 2.

The body 2 is formed to provide a receptacle for containing a sample of the liquid to be tested while surrounding and in contact with the temperature sensitive element 5 of the thermometer. For this purpose, a packing gland such as a rubber ring 6 is mounted in the body 2 to prevent leakage around the stem 4 of the thermometer while permitting both longitudinal and rotary movement thereof. Means for freezing the sample of liquid is provided in the form of a cup shaped container and heat exchanger 7 comprising a cylinder 8 surrounding the lower end of the thermometer within a cylindrical enlargement 9 of the opening 3 in the body 2. The heat exchanger is provided with an inlet opening 11 for the admission of a refrigerant such as decompressed carbon dioxide gas and snow, and is formed with external flanges 12 providing a labyrinthine path for the refrigerant which is allowed to escape at 13. The bottom of the cylinder 8 forms a seat for the lower end of the thermometer, and the upper end of the cylinder is suitably packed as by a rubber gland ring 14. The heat exchanger is retained in the body 2 by suitable means such as a cross bar 15 of plastic material anchored to the body by cap screws 16.

A small amount of clearance is provided within the tubular opening 3, around the stem 4 of the thermometer, and an internal groove 17 is formed just below the packing gland 6 which groove is connected by a port 18 (Fig. 2) to a laterally extending threaded socket 19 formed in the body 2 for the reception of a nipple 21. A valve cap 22 is threaded on the nipple 21 and is formed with a spud 23 for the reception of a hose for convenient extraction of liquid for instance from the radiator of an internal combustion engine. A packing ring 24 seated in the nipple 21 prevents leakage from the valve cap 22, and a valve seat member 25 in the bottom of the cap is arranged to bear against the end of the nipple and prevent leakage when the cap 22 is screwed down tightly.

In order to fill the receptacle in the body 2 with a sample of the liquid to be tested, means are provided for reciprocating the thermometer in said body whereby it acts as a piston for drawing the sample into the receptacle and expelling air therefrom. As here shown this means comprises a plunger 26 slidably journalled in a bearing member 27 mounted in the upper end of the frame 1, said plunger having a socket member 28 fixed on its lower end which socket is slotted and formed to elastically grip the upper end of the thermometer stem 4. The upper end of the plunger 26 is formed with a head 29 of "double D" cross section (Fig. 4) which is slidably received in a similarly formed opening 31 in a knob 32.

Said knob has a flange 33 surrounding the plunger 26 below the head 29, and normally spaced therefrom to provide some lost motion in an axial direction. A spring 34 located in a counter-bore in the bearing member 27 bears on the socket member 28 and normally maintains the thermometer with its lower end resting on the bottom 35 of the heat exchanger tube 8 as shown in Fig. 1.

By means of the knob 32, the thermometer may be withdrawn partially from the body 2, and by releasing the knob the spring 34 will return the thermometer to its normal position to perform the pumping action above referred to. In view of the splined relation between the head 29 and knob 32 due to the double D formation of the head, the thermometer may be rotated or oscillated in order to agitate the sample and promote its crystallization during the freezing operation. The lost motion between the head 29 and flange 33 of the knob is provided to make sure that the spring 34 is free to seat the thermometer in its normal position, and to protect the thermometer against shocks which might inadvertently be transmitted if the knob were fixed on the plunger 26.

In order to indicate changes in volume of the sample during the freezing and thawing operation, one wall of the receptacle has mounted therein a flexible diaphragm 36, and a reservoir of indicating liquid 37 is formed on the outer side of said diaphragm and connected to a stand pipe in the form of a capillary tube 38 which is mounted in the frame 1 parallel to the thermometer stem 4.

The diaphragm 36 is clamped in an opening 39 in the side of the body 2 by means of a plug 41 which is attached to said body by suitable means such as cap screws 42, and is drilled as indicated at 43 to provide a passage from the reservoir 37 to a canal 44 in the body 2 leading to a socket 45 which receives the lower end of the capillary indicating tube 38. Packing rings 46, 47 and 48 are provided for preventing leakage from the reservoir 37.

The upper end of the indicating tube 38 is received in a socket 49 in the bearing member 27, preferably being seated on a pad 51 of felt or similar material which acts as an elastic means to hold the tube against its seat in the socket 45, as well as a filtering means to exclude dust while permitting the tube to "breathe" as the indicating liquid rises or falls therein. A disc 50 and screw 50' are preferably employed to adjust the compression of the felt against the end of the tube.

The indicating liquid is preferably in the form of a suitably dyed oil such as a silicone derivative of fairly high viscosity, so that the variations of pressure on diaphragm 36 caused by the pumping action of the thermometer while drawing the sample will not break or separate the column of liquid in the indicating tube.

A pointer 52 of suitable material such as transparent plastic is slidably mounted on the indicator tube 38 and formed with an index mark 53 bearing on the scale of the thermometer stem 4 in order to facilitate recording the critical reading of the thermometer.

In the operation of the device, the sampling tube 20 is introduced into the liquid to be tested, and the thermometer is reciprocated by means of the knob 32 to draw a sample of the liquid into the receptacle until the air is expelled therefrom and the receptacle completely filled with sample. The valve cap 32 is then closed tightly to trap the sample in the receptacle.

The inlet 11 of the instrument is then connected to a source of compressed carbon dioxide, and a stream of expanding gas and snow passed through the heat exchanger 7 until the sample in the receptacle is frozen. During this time the thermometer may be rotated or oscillated by means of the knob 32 but will be at all times maintained seated against the bottom 35 of the heat exchanger by means of the spring 34. As the sample is cooled by the heat exchanger 7, its volume shrinks, as is indicated by the lowering of the level of liquid in the indicating tube 38, until ice crystals begin to form in the sample which is signalized by a rise of the liquid column. When this occurs, the freezing operation is stopped and the sample allowed to thaw. As the sample thaws, the volume shrinks until the last crystals melt. This shrinkage is indicated by the lowering of the liquid in the tube 38, and the indicating liquid becomes stationary at the critical point where the last crystals melt, which point is taken as the freezing or melting point of the sample. As the sample warms up, the volume again expands and the column of liquid in tube 38 rises, so that the critical point is easily identified.

When the critical point is observed, the slide 52 is adjusted to place its index 53 opposite the top of the liquid in the thermometer stem 4 so as to record the temperature of the thermometer at the thawing point of the sample.

Although but one form of the invention has been shown and described in detail, it will be understood that changes may be made in the precise form and arrangement of the parts of the instrument without departing from the spirit of the invention.

I claim:

1. In a freezemeter for arctic coolants for internal combustion engines and the like, a sample-holding receptacle, a thermometer having its temperature-sensitive element in said receptacle, means for filling the receptacle with a sample of the liquid to be tested, means for admitting a refrigerant to freeze said sample in the receptacle, and means furnishing a continuous indication of changes of volume of the sample as it freezes and thaws; said thermometer being movably mounted in the sample-holding receptacle, and including further a packing gland preventing leakage of the sample where the thermometer enters said receptacle; and means for reciprocating the thermometer in the receptacle.

2. In an instrument for determining the freezing point of liquids, a thermometer having a temperature-sensitive element at one end and a cylindrical stem extending therefrom, a frame and housing member slidably receiving and enclosing said end of the thermometer to thereby provide a receptacle for a sample of the liquid to be tested, inlet means for said receptacle, means for admitting a refrigerant to freeze said sample in said receptacle, and means for indicating changes of volume in said sample; including further a filler connection to said inlet for said receptacle, means for reciprocating the thermometer in the receptacle to facilitate filling the receptacle with the liquid to be tested and a valve for closing the receptacle.

3. An instrument as set forth in claim 2 including further means to define the normal position of the thermometer in the receptacle.

4. An instrument as set forth in claim 3 in which the thermometer is of the fluid type, and the means for indicating changes of volume in said sample comprises a capillary tube forming a stand pipe connected to the reservoir, and the frame member supports the thermometer stem and the stand pipe in adjacent parallel relation for convenient concurrent observation of the levels of the liquids therein.

References Cited in the file of this patent

UNITED STATES PATENTS

| | | |
|---|---|---|
| 2,635,456 | Barstow | Apr. 21, 1953 |
| 2,671,335 | Bussey | Mar. 9, 1954 |